Nov. 15, 1955 F. E. BRONK Re. 24,087

EQUIPMENT STAND

Original Filed Dec. 9, 1950 4 Sheets-Sheet 1

INVENTOR.
FAY E. BRONK

BY Edward S. Rumpston

HIS ATTORNEY

EQUIPMENT STAND

Original Filed Dec. 9, 1950 4 Sheets-Sheet 2

INVENTOR.
FAY E. BRONK

BY Edward H. Rumpston

HIS ATTORNEY

EQUIPMENT STAND

Original Filed Dec. 9, 1950 4 Sheets-Sheet 3

INVENTOR.
FAY E. BRONK

BY Edward S. Rumpston

HIS ATTORNEY

EQUIPMENT STAND

Original Filed Dec. 9, 1950 4 Sheets-Sheet 4

INVENTOR.
FAY E. BRONK
BY
Edward H. Rumpf
HIS ATTORNEY

United States Patent Office

Re. 24,087
Reissued Nov. 15, 1955

24,087

EQUIPMENT STAND

Fay E. Bronk, Rochester, N. Y., assignor to Ritter Company, Inc., Rochester, N. Y., a corporation of Delaware Original No. 2,690,945, dated October 5, 1954, Serial No. 200,075, December 9, 1950. Application for reissue January 24, 1955, Serial No. 483,856

36 Claims. (Cl. 312—22)

Matter enclosed in heavy brackets [ ] appears in the original patent but forms no part of this reissue specification; matter printed in italics indicates the additions made by reissue.

This invention relates to equipment stands and, more specifically, to stands of the type comprising a unitary column or pedestal for supporting a variety of dental, medical and like equipment, within convenient reach of the operator adjacent the place of use, one object of the invention being to provide an improved apparatus of this character having a more simple practical and efficient type of construction.

Another object is to provide an improved apparatus of this nature in which a variety of hand instruments are projected for use in a readily accessible position and, when not in use, are retracted within the stand and protected against injury, contamination and dust.

Another object is to provide such an apparatus in a form which is motor-operated and more readily and conveniently controlled by the operator.

A further object is the provision of an apparatus with the above advantages composed of parts having a more simple and practical form of construction and arrangement and capable of being more easily and economically manufactured and assembled.

To these and other ends the invention resides in certain improvements and combinations of parts, all as will be hereinafter more fully described, the novel features being pointed out in the claims at the end of the specification.

Figures 1, 2, 3:
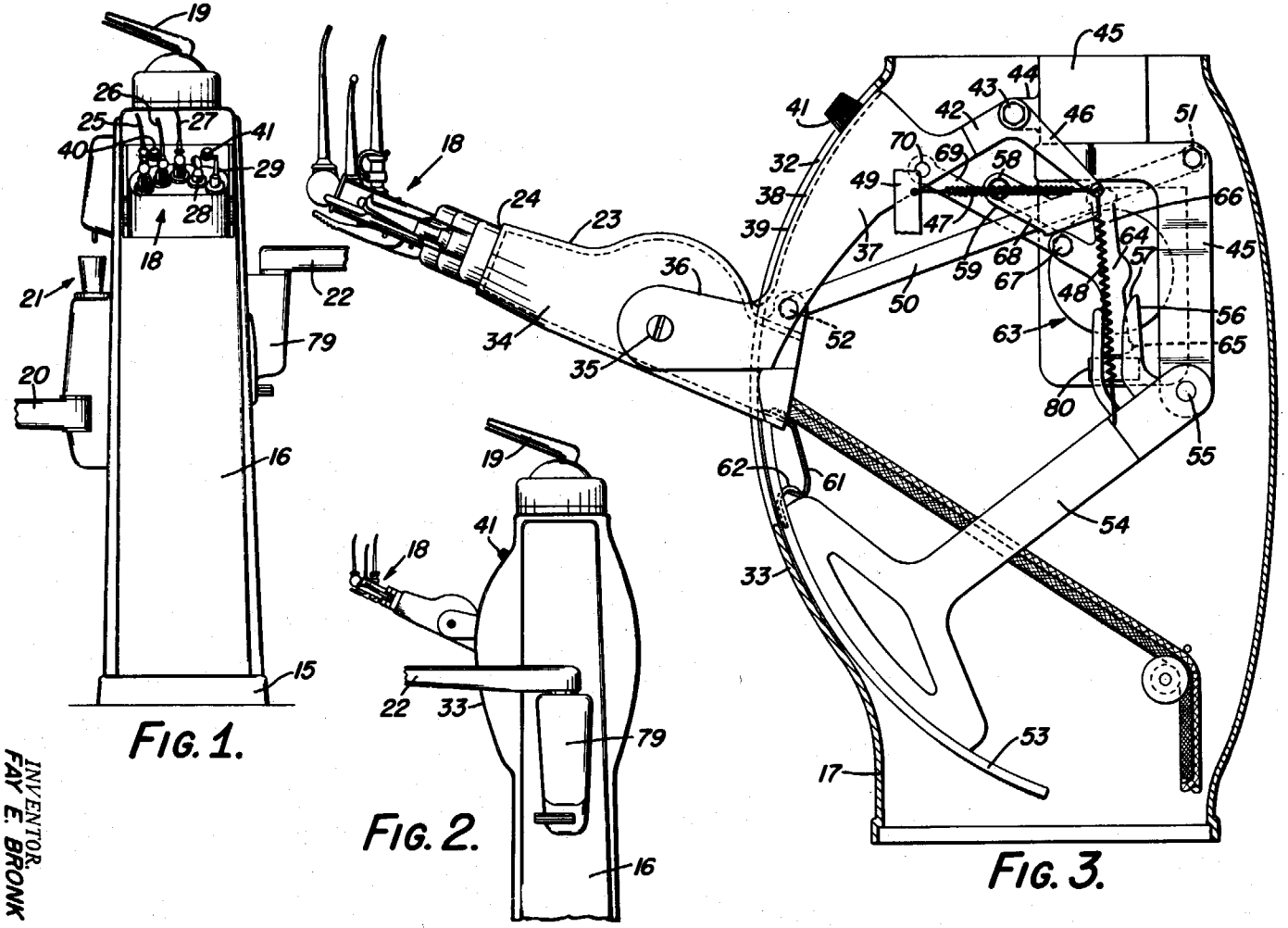
Fig. 1 is a front elevation of an equipment stand embodying the present invention, partly broken away and with the instrument holder advanced.
Fig. 2 is a fragmentary elevation thereof as seen from the right in Fig. 1.
Fig. 3 is an enlarged, sectional elevation of parts shown in Figs. 1 and 2, with the instrument holder advanced.

The embodiment of the invention, herein disclosed by way of illustration, preferably comprises a base or pedestal 15 for an upright column 16 supporting a unitary assembly of equipment, the column preferably comprising an inner structural supporting frame (not shown), enclosed by detachable casing sections, such as 17 (Fig. 3), together forming a housing within which the equipment is supported, enclosed and protected. The stand preferably includes a plurality of hand instruments, indicated generally at 18, a superposed engine arm 19, a cuspidor bowl arm 20, a tumbler holder and water nozzle, indicated generally at 21, and an instrument table arm 22.

The means for holding and positioning the hand instruments, to which the present invention more particularly relates, comprises, preferably, a holder 23 in the form of a hollow casing having its forward or upper end 24 formed with a series of inwardly extending sockets for detachably receiving and supporting the handle portions of a plurality of hand instruments such as a spray syringe 25, warm water syringe 26, warm air syringe 27, mouth lamp and cautery 28, and a pulp tester 29, these instrument handle portions being connected by flexible conducting tubes or cords with sources of supply of operating media, such as electrical current, compressed air and water, as well understood in the art. These supply cords are connected at their lower ends with spring or weight retracting means (not shown) in the column, so that any one of the instruments 18 may be grasped by the operator to remove it from its socket and extend it to the point of use, the cord being retracted when the instrument is returned to its socket in the holder, as well understood in the art.

The holder is supported for movement to project it forwardly through an opening 32 in a portion 33 of the housing of generally cylindrical curvature, as shown. The opposite sides of the holder, as 34, carry trunnions 35 serving to pivotally connect the holder between spaced arms 36 extending forwardly from the lower ends of the opposite sides 37 of a control panel 38, the front wall 39 of which is of generally cylindrical curvature, so as to extend parallel with and in close proximity to the inside of the housing portion 33 opposite its opening 32, in the extended position of the parts shown in Fig. 3. Panel 38 is adapted to support and enclose control devices such, for example, as rheostats having forwardly projecting operating knobs, as 40 and 41 for regulating mouth lamp and cautery instruments, respectively, and the like. The side walls 37 of panel 38 have their upper ends extended to provide spaced arms 42 which are pivoted on studs or trunnions 43 carried by lugs 44 on the ends of a U-shaped supporting frame portion 45. Arms 42 are extended beyond their pivots to provide fingers 46 each having its end connected to counterbalance springs 47 and 48. Each spring 47 is connected to a stationary frame portion 49, for counterbalancing the weight of the panel and holder, while spring 48, for a like purpose is connected at its other end to a cover portion, hereafter described, for closing the opening 32 of the housing while the instrument holder is retracted.

Figure 4:
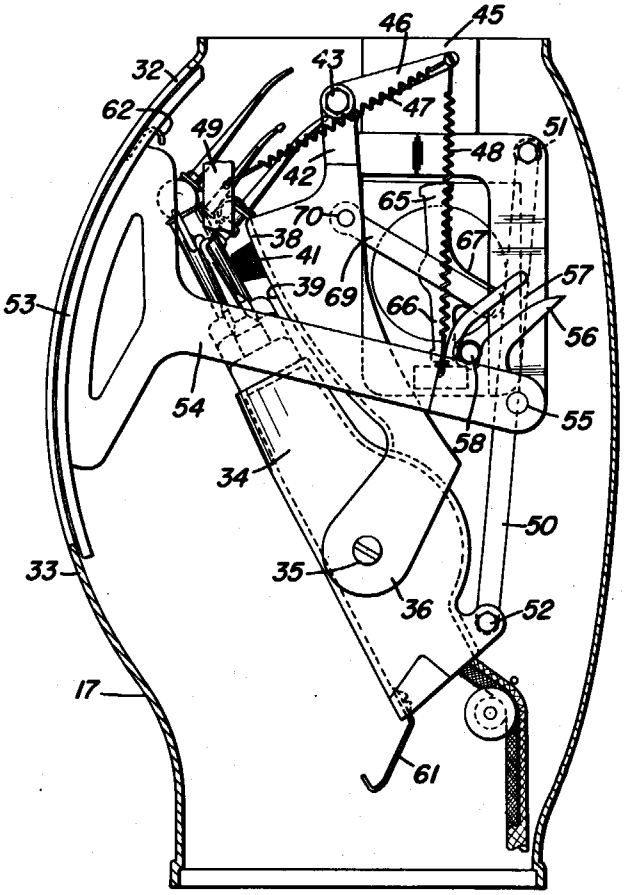
Fig. 4 is a view similar to Fig. 3 but with the instrument holder retracted within the housing of the stand and the housing opening closed by a cover.

Link means are provided, in addition to the pivoted control panel 38, for supporting the holder 34, such means comprising spaced links 50, each having one end pivoted at 51 to the corresponding end of frame portion 45. The other end of each link 50 is pivotally connected at 52 to the rear end of the corresponding side portion of the holder 34, and it will be seen from this construction that the holder is supported by the control panel 38 and the links 50 so as to swing from a retracted position in the housing, as shown in Fig. 4, through the housing opening 32 to the advanced position shown in Fig. 3 in which the instruments carried by the holder are projected to an accessible position for selective use within the reach of the operator. During this movement, the control panel 38 is likewise swung from the retracted position shown in Fig. 4 to the position shown in Fig. 3, in which it lies against the inside of the wall of the housing so as to cover the opening 32 therein, above the holder 34, with the control devices, such as the knobs 40, within convenient reach of the operator.

Figure 5:
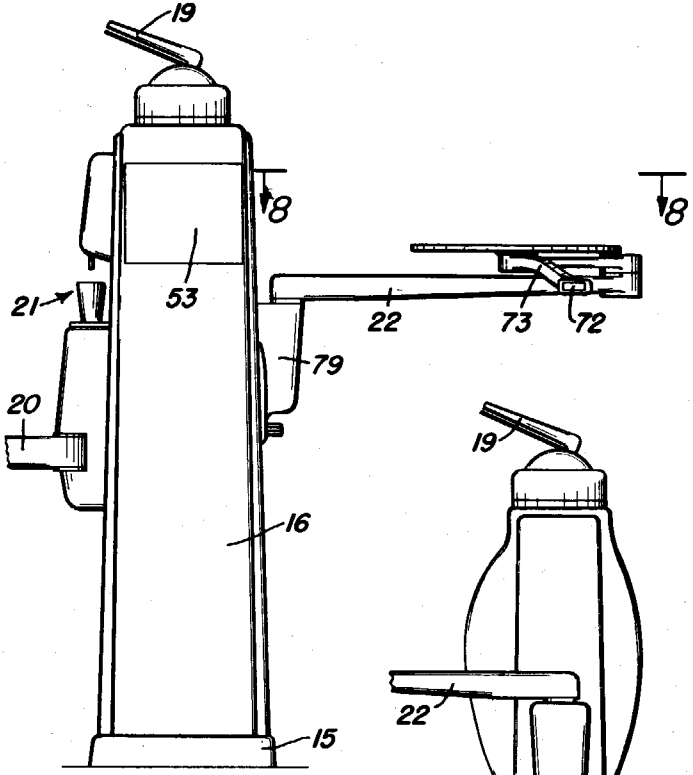
Fig. 5 is a front elevation similar to Fig. 1, but showing the instruments retracted as in Fig. 4.
Figure 6:
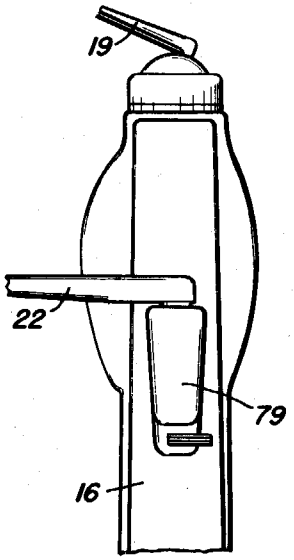
Fig. 6 is a fragmentary side elevation of the parts as viewed from the right in Fig. 5.

Means are provided for closing the housing opening 32 when the holder and panel are retracted, comprising preferably, a coverplate 53 of generally cylindrical curvature, adapted to swing parallel with and in close proximity to the inside of the housing wall 33 so as to close the opening 32, as shown in Figs. 4 and 5. Cover plate 53 is carried by a pair of spaced arms 54, each having one end fixed to the plate and the other pivotally connected, as by trunnion or like means 55, with the corresponding end of frame portion 45, as shown. Springs 48 are connected with arms 54 to counterbalance the weight of this cover means.

Figure 7:
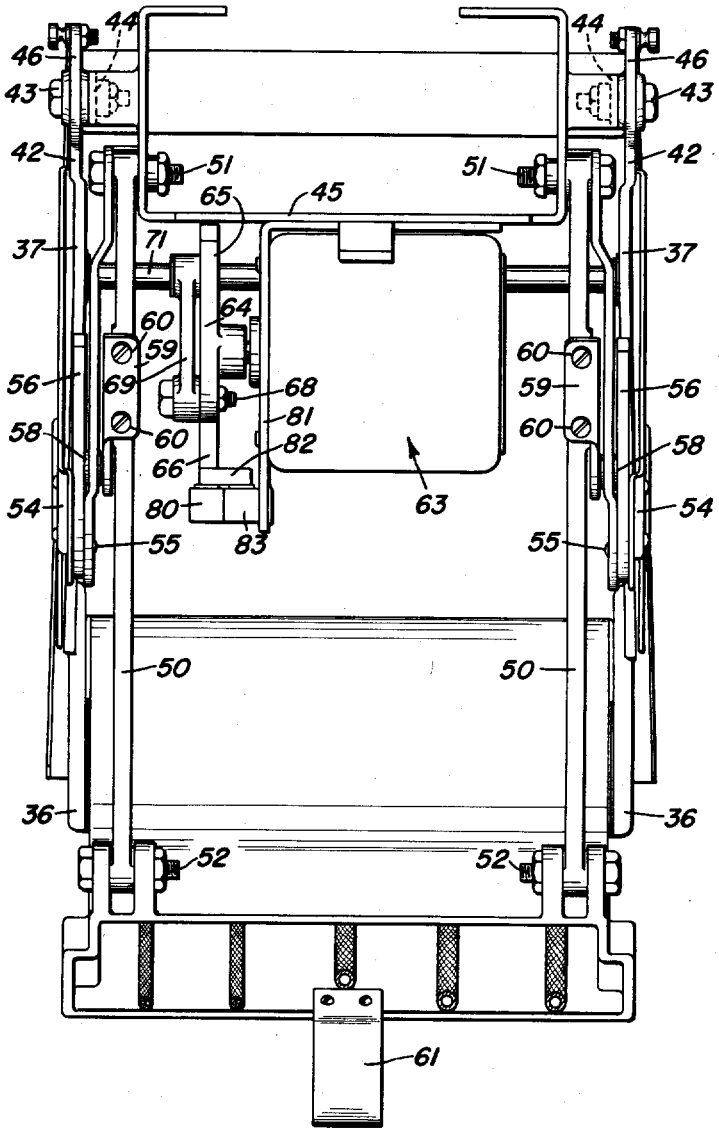
Fig. 7 is an enlarged rear elevation of the parts shown in Fig. 4, with the housing or casing removed.

The cover means, including plate 53 and its supporting arms 54, are actuated by a cam means or device comprising, on each arm, an upwardly projecting lug 56 on which is formed a slot 57 adapted to receive an actuator roller 58 carried by a bracket 59 fixed on the corresponding arm 50, as by means of screws 60 (Fig. 7). It will be seen from this construction that as the link arms 50 descend from the position shown in Fig. 3 to retract the instrument holder 34, the rollers 58 carried by these link arms engage in the slots 57 of the cams on the cover arms 54, and swing the cover arms and cover upwardly, after the holder is retracted, to cover and close the opening 32 in the housing, as shown in Fig. 4. When the holder is again advanced to project the instruments, a reverse action takes place in which the cover arms and cover are allowed to drop, or forced down by rollers 58 working in the cam slot 57, under the counterbalancing restraint of springs 48, to a position somewhat lower than that shown in Fig. 3, thereby uncovering the opening 32 in the housing to allow the advance of the holder. The lower rear end of the holder carries a hook-shaped bracket 61 shaped for engagement with a similar bracket 62 on the inside of cover plate 53, to raise the cover plate and hold its upper edge in close proximity to the lower surface of the holder, as the latter is raised and projected as shown in Fig. 3, thereby insuring the closure of the opening below the holder, while the opening above the holder is closed by the panel 38, so as to maintain a continuous wall surface and complete closure of the opening while the holder and panel are advanced. It will be understood that as the holder 34 is raised and projected, the cover arms 54 are lowered somewhat below the position shown in Fig. 3, until the rollers 58 clear the forward side of the cam slot 57 and that the bracket 61 of the holder engages the bracket 62 of the cover, as the holder is raised to the position shown in Fig. 3, to raise the top edge of the cover into close proximity with the bottom of the holder, as shown, to close the opening below the holder.

The motor means for moving or swinging the holder and associated parts to and from the positions described comprises, preferably, an electric motor indicated generally at 63, mounted on and depending from the frame portion 45. The motor includes a speed reducing gearing of known character (not shown) having a shaft on which is fixed an actuating element 64 having three projecting arms. Two of these arms, 65 and 66, extend diametrically in opposite directions and have rounded ends, as shown, for the actuation of switch means hereafter described. A third arm 67 serves as a crank arm and is pivotally connected at 68 with a link 69 having its other end pivotally connected at 70 with a spindle 71, the ends of which are mounted in the ends of the control panel 38. It is apparent from this construction that with the parts in the position shown in Fig. 4, a half rotation of the actuating element 64 serves to swing the holder, panel and cover parts to the position shown in Fig. 3 in which the instruments are projected for use, while another half rotation of the element 64 serves to return all of the parts to the retracted position shown in Fig. 4. *It will be particularly noted that the motor is positively connected to the control panel 38 which in turn is positively connected to the holder 34. Thus, any rotation of the motor is reflected in movement of the panel and holder.*

*Upon a comparison of Figs. 4 and 3, it will be observed that when rotation of the motor is initiated, the cover is moved rapidly toward an open position accompanied by very little movement of the holder. However, before the cover reaches a fully open position the projection of the holder is well started and, thereafter, the holder is moved rapidly to the extended position of Fig. 3. The movements of the cover and holder are thus synchronized so that they overlap and the motion of the holder is rapidly accelerated as soon as the opening is clear to the end that the instruments are accessible for use in a minimum of time.*

Figure 8:
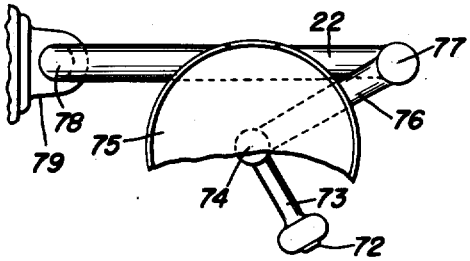
Fig. 8 is a top plan view, partly broken away, of the parts of the instrument table arm as arranged in Fig. 5.

Circuit means are provided for operating the motor comprising switch means for controlling the described movements of the parts. In the retracted position of Fig. 4, an automatic switch for controlling the circuit is bridged by a manually operable switch, to initiate movement of the parts from one position to another, after which the motor means actuates the automatic switch to continue the movement, after release of the manual switch, until the parts reach the desired position such as that shown in Fig. 3. As the parts reach such position, the motor means again actuates the automatic switch to open the circuit and the parts are stopped in the desired position, until the manual switch is again actuated to return the parts to their other position. The manually operable switch, of any known and suitable variety, is indicated at 72 (Figs. 5 and 8) in the outer end of an arm 73 pivoted about the axis 74 of the usual instrument table 75 which is carried by the end of an arm 76. The latter has its other end pivoted at 77 to the outer end of the arm 22 which is pivoted in turn at 78 on a boss 79 on the housing. These several arms and their pivotal connections are of hollow construction and the wiring for the switch is carried through them into the housing. The manual switch is thus adjustably supported for movement to a convenient position within reach of the operator.

The automatic switch is preferably of the spring-actuated, normally closed type, such as that which is commercially available under the trade designation "Switchette," and is shown at 80 on a bracket 81 carried by the motor mounting, in position for actuation by the cam-shaped ends of the motor-driven rotary element 64. One end of this element is extended, as at 82, in position to actuate an associated switch 83 for controlling the low voltage circuit for the several electrical hand instruments, but this low voltage switch forms no part of the present invention.

It will be seen from this construction that with the parts in the retracted position shown in Figs. 4 and 7, one end of the actuator 64 is in engagement with switch 80 to hold it in position to open the circuit, with the parts at rest. On actuation of the normally open manual switch 72, the circuit is closed around the automatic switch 80, by circuit connections hereafter described, to start the operation of the motor. This moves actuator 64 to release switch 80 which is thereupon closed by its spring action to maintain the parts in motion until they reach the advanced position shown in Fig. 3, at which time the opposite end of actuator 64 engages switch 80 to open the circuit and arrest the parts in such position. Subsequent closing of the manual switch operates in similar fashion to return the parts to and arrest them in the retracted position shown in Figs. 4 and 7.

Figure 10:
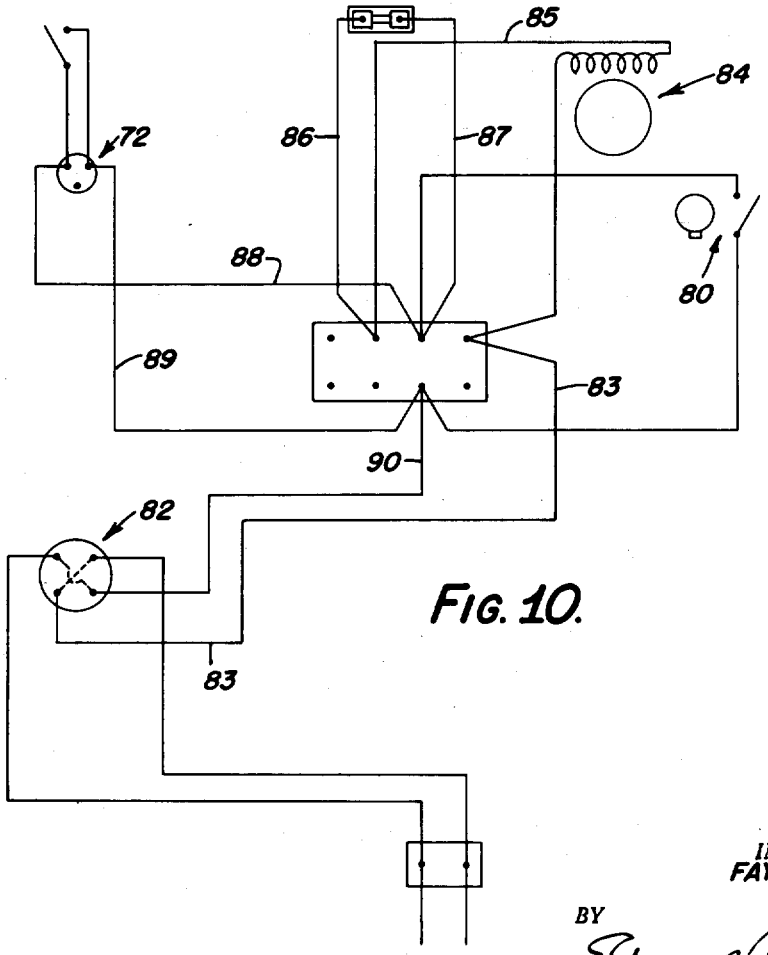
Fig. 10 is a diagram of circuit connections for the motor and switch means for operating the instrument holder and associated parts.

The circuit connections are shown in Fig. 10, from which it will be seen that the manually operable switch 72 is arranged to close the circuit from the main switch 82 through conductor 83 to the motor 84 and thence through conductors 85 to 90, inclusive, back to the other side of the main switch, around the automatic or limit switch 80 while the latter is in open position. By this means the motor is started and closes switch 80, as described, with the result that the circuit is closed as before, but through the automatic switch 80, instead of the hand switch 72, thus energizing the motor until the other end of actuator 64 again strikes the switch 80 to open it and arrest the movement of the parts as described.

Figure 9:
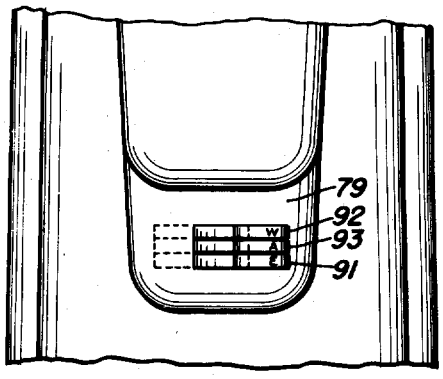
Fig. 9 is an enlarged, fragmentary, side elevation of the equipment stand shown in Fig. 6, showing the control switch means in more detail

The main switch 82 is preferably operated by a disk-like member 91 (Fig. 9) having a portion of its periphery projecting through a slot in the boss 79 of the housing below the instrument table arm. The oscillation of this disk through a suitable angle serves to open and close the main switch, and similar associated disk means 92 and 93 are preferably provided for controlling the supply of water and compressed air to the equipment, to afford a convenient assembly of such control means in the same locality on the housing.

The operation of the mechanism has been described above in connection with the explanation of its construction, and it is apparent that with the stand conveniently located at one side of an operating chair, as well understood in the art, the manual switch 72 is adjustably and conveniently positioned within easy reach of the operator to initiate movement of the parts from the retracted position shown in Fig. 4 to the projected position of use shown in Fig. 3. A brief closure of the manual switch serves to start the motor and close the automatic switch until the parts reach the projected position of use shown in Fig. 3, at which time the motor means brings about the opening of the circuit and arrests the parts. Such operation first swings the cover away from the opening in the housing and swings the holder and panel to the advanced position shown, in which they are projected within easy reach of the operator.

*As well understood in the art to which this invention applies, the patient is seated on a chair or otherwise supported adjacent the stand. The projection of the holder to a position almost wholly outside the stand, as shown in Fig. 3, brings the ends of the instruments which extend outward from the holder to a position such they lie partly across the patient. Moreover, it will be noted that the holder is rotated, as it is projected, from an essentially vertical position (Fig. 4) to an essentially horizontal position (Fig. 3). A large percentage of dentists are now operating from a seated position. The projection of the instruments and their rotation enables the dentist to grasp a desired instrument and pull it outward for use by an essentially horizontal straight pull and without undue stretching across the patient to reach the desired instrument.*

[In this position] *In the position of the parts shown in Fig. 3,* the opening in the housing is effectively closed to prevent entry of foreign objects, dust and the like, and maintain a sightly appearance. After use of the equipment, operation of the manual switch retracts the instrument holder and control panel and completely closes the housing opening to protect the parts and maintain the finished and pleasing appearance of the equipment stand.

The effective and convenient operation of the several parts is accomplished through the provision of an efficient construction comprising relatively few parts, of compact design, adapted to be readily and economically assembled and maintained in efficient operating condition.

While the medical instruments hereinabove referred to are of a nature particularly adapted for the practice of the dental branch of medicine, it is contemplated that instruments for practicing other branches of medicine may be associated with equipment embodying the present invention, and the references herein to medical equipment and instruments are intended to include those adapted for use in such other branches of medicine also, within the scope of the appended claims.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A medical equipment stand comprising a housing having an opening, a holder in said housing for a plurality of medical instruments, link means pivotally connected with said housing and supporting said holder for swinging movement toward and from said opening, electrical motor means having a rotary crank, a connection from said crank to said holder for swinging said holder, and circuit means for operating said motor means.

2. A medical instrument stand comprising a housing formed with an opening, a medical instrument holder, pairs of links each pivotally connected with said housing and with said holder and supporting said holder for swinging movement toward and from said opening, electrical motor means provided with a rotary crank, a connection from said crank to one of said pairs of links for swinging said holder, circuit means for operating said motor, and switch means for controlling said circuit means.

3. A medical equipment stand comprising a housing having a wall formed with an opening, a medical instrument holder link means pivotally connected with said housing and holder and supporting said holder for swinging movement toward and from said opening, a cover pivotally mounted on said housing for swinging movement parallel with said wall to open and close said opening, and motor means on said housing for swinging said cover and said holder to uncover said opening when said holder is moved toward the same, and circuit means for operating said motor means.

4. A medical equipment stand comprising a housing formed with an opening, a medical instrument holder, link means pivotally connected with said housing and holder and supporting said holder for swinging movement toward and from said opening, a cover pivotally mounted on said housing for movement to open and close said opening, rotary crank means on said housing, connections from said crank means to said holder and cover for swinging said holder and said cover to uncover said opening when said holder is swung toward the same, and means for operating said crank means.

5. A medical instrument stand comprising a housing formed with an opening, a medical instrument holder, link means supporting said holder for swinging movement toward and from said opening, a cover pivotally mounted on said housing for swinging movement thereon to open and close said opening, motor means connected with said holder and with said cover for swinging the same to uncover said opening when said holder is moved toward said opening, and circuit means for operating said motor means.

6. A medical equipment stand comprising a housing formed with an opening, a medical instrument holder, link means pivotally connected with said housing and holder and supporting said holder for swinging movement toward and from said opening, cover means pivotally supported on said housing, electrical motor means connected with said link means and having cam means connected with said cover means to swing the same for uncovering said opening when said holder is moved toward the same, and circuit means for operating said motor means.

7. A medical equipment stand comprising a housing formed with an opening, a medical instrument holder, link means pivotally connected with said housing and supporting said holder for swinging movement toward and from said opening, cover means pivotally mounted on said housing for swinging movement to cover and uncover said opening, electrical motor means having a rotary crank, a connection between said crank and link means for swinging said holder, a cam on said cover means, a cam actuator on said link means for moving said cam and cover means to uncover said opening when said holder is swung toward the same, and circuit means for operating said motor means.

8. A medical equipment stand comprising a housing formed with an opening, a medical instrument holder, link means on said housing and supporting said holder for swinging movement toward and from said opening, cover means pivotally mounted on said housing for opening and closing said opening, means having connections with said holder and cover means for swinging said cover means and said holder to uncover said opening when said holder is moved toward the same, and interengageable means on said holder and cover means for moving said cover means toward said holder when said holder is swung toward said opening to maintain the closure thereof.

9. A medical equipment stand comprising a housing formed with an opening, a medical instrument holder, link means pivotally connected with said housing and holder and supporting said holder for swinging movement toward and from said opening, motor means having a rotary element connected with said holder for swinging the same, circuit means for operating said motor means, and automatic switch means for controlling said circuit means, said rotary element having a part for operating said switch means.

10. A medical equipment stand comprising a housing formed with an opening, a medical instrument holder, link means pivotally connected with said housing and holder and supporting said holder for swinging movement toward and from said opening, motor means having a rotary element connected with said holder for swinging the same, circuit means for operating said motor means, and a pair of switches for controlling said circuit means, said element having rotary parts for successively actuating one of said switches to alternately operate and stop said motor means for swinging said holder toward and from said opening.

11. A medical instrument stand comprising a housing formed with an opening, a medical instrument holder, link means pivotally connected with said housing and holder and supporting said holder for swinging movement toward and from said opening, motor means having a connection with said holder for swinging the same, circuit means for operating said motor means, and a switch for controlling said circuit means, said motor means having a rotary element provided with diametrically spaced parts for successively actuating said switch during rotation of said element to alternately operate and stop said motor means for moving said holder toward and from said opening.

12. A medical instrument stand comprising a housing formed with an opening, a medical instrument holder mounted in said housing for swinging movement toward and from said opening, motor means having a rotary element provided with a crank connected with said holder for swinging the same, cricuit means for operating said motor means, a manually operable switch for closing said circuit means, and an automatic switch for closing said circuit means, said rotary element having diametrically spaced parts for successively actuating said automatic switch during rotation of said element to alternately operate and stop said motor means for moving said holder toward and from said opening.

13. A medical equipment stand comprising a housing formed with an opening, a medical instrument holder, link means pivotally connected with said housing and holder and supporting said holder for swinging movement toward and from said opening, a panel provided with control means movably connected with said housing and with said holder for swinging movement toward and from said opening with said holder, and means for swinging said panel and holder.

14. A medical equipment stand comprising a housing formed with an opening, a medical instrument holder in said housing, a control panel movably connected with said housing and holder, link means movably connected with said housing and holder and supporting said holder and panel for swinging movement toward and from said opening, electrical motor means for swinging said holder and panel, and circuit means for operating said motor means.

15. A medical equipment stand comprising a housing formed with an opening, a medical instrument holder in said housing, a control panel movably connected with said housing and holder, link means movably connected with said housing and holder and supporting said holder and panel for swinging movement toward and from said opening, electrical motor means for swinging said holder and panel, circuit means for operating said motor means and switch means actuated automatically by said motor means for controlling said circuit means.

16. A medical equipment stand comprising a housing formed with an opening, a medical instrument holder in said housing, a control panel movably connected with said housing and holder, link means movably connected with said housing and holder and supporting said holder and panel for swinging movement toward and from said opening, means for moving said holder and panel, and cover means pivotally mounted on said housing and having a connection with said motor means for opening and closing said opening when said holder and panel are moved toward and from said opening.

17. A medical equipment stand comprising a housing formed with an opening, a medical instrument holder, link means pivotally connected with said housing and holder and supporting said holder for swinging movement toward and from said opening, cover means for unclosing and closing said opening when said holder is moved toward and from the same, an instrument table arm movably mounted on said housing for adjustment to different positions adjacent thereto, electrical motor means having connections with said holder and cover means for moving the same, circuit means for operating said motor means, a manually operable switch on said table arm for closing said circuit means to initiate movement of said holder and cover means, and an automatic switch in said circuit, said motor means having a part for operating said automatic switch to open said circuit and stop said holder and cover means at the end of each of the movements thereof.

18. A medical equipment stand comprising a housing formed with an opening, a medical instrument holder, link means pivotally connected with said housing and holder and supporting said holder for swinging movement toward and from said opening, cover means for opening and closing said opening when said holder is moved toward and from the same, an instrument table arm movably mounted on said housing, an arm pivoted on said table arm to swing about the center of said table for adjustment to different positions adjacent said housing, a manually operable switch on said pivoted arm, electrical motor means having connections with said holder and cover means for moving the same, circuit means for operating said motor means, a manually operable switch on said pivoted arm for closing said circuit to initiate movement of said holder and cover means, and an automatic switch for controlling said circuit, said motor means having a part for actuating said automatic switch to open said circuit and stop said holder and cover means at the end of each of the movements thereof.

19. A medical instrument stand comprising a housing formed with an opening *a closure for said opening, means for moving said closure to a position within the housing,* a holder for medical instruments in said housing, a plurality of medical instruments detachably mounted in said holder, [link] means [pivotally] connected with said housing and holder and supporting said holder for swinging movement toward and from said opening to present said instruments exteriorly thereof, and means for swinging said holder on said [link] means toward and from said opening.

20. A medical instrument stand comprising a housing formed with an opening, a holder for medical instruments in said housing, a plurality of medical instruments detachably mounted in said holder and provided with conducting means extending into said housing for supplying said instruments with operating media, links pivotally connected with said housing and with said holder to support said holder for swinging movement toward and from said opening to present said instrument exteriorly of said housing, electric motor means connected with said links for swinging said holder toward and from said opening, and circuit means for operating said motor means.

*21. A medical equipment stand comprising, in combination, a housing having an opening, a movable closure, means including a motor for moving said closure to open and close said opening, a holder for a plurality of medical instruments, means including said motor for moving said holder from a position within the housing to a projected position with respect to said housing to enable convenient selection and use of the desired instrument, means interconnecting said closure moving means and said holder moving means whereby their movements are synchronized, said motor being positively connected to said holder whereby any rotation of said motor is reflected in movement of said holder.*

*22. A medical equipment stand in accordance with claim 21, in which said holder moving means includes means for rotating the holder from a position when within the housing at least approaching the vertical to a position at least approaching the horizontal while it is being projected.*

*23. A medical equipment stand comprising, in combination, a housing having an opening, a closure for said opening, means supported by the housing for moving said closure from a position closing said opening to a position within the housing, a holder from which a plurality of medical instruments extend, means for supporting said holder within the housing means for moving said holder from an essentially vertical position within the housing through said opening to a projected position, said means including elements for moving said holder in an arcuate path while it is being projected, said holder in its projected position lying almost wholly beyond the margins of said opening and in an essentially horizontal position, the position of extension of the instruments when the holder is projected coupled with the essentially horizontal position of the holder enabling the user to select and grasp an instrument for use without undue reaching across a patient supported adjacent said stand and withdraw said instrument from said holder by an essentially horizontal withdrawing motion and means interconnecting said closure moving means and said holder moving means for synchronizing their movements.*

*24. A medical equipment stand comprising, in combination, a housing having an opening, a closure for said opening, means for moving said closure from a position closing said opening to a position within the housing leaving said opening substantially free and unobstructed, a holder for a plurality of medical instruments, means for projecting said holder through said opening and simultaneously rotating it from a position at least approaching the vertical to a position at least approaching the horizontal, said projecting means including a panel movable with the holder from a position within the housing to a position substantially closing such part of the opening as remains after the holder has been projected.*

*25. A medical equipment stand comprising, in combination, a housing having an opening, a closure for said opening supported on the housing, a holder for a plurality of medical instruments, means within the housing for moving said closure and holder in synchronism so that when the closure has at least partly cleared said opening, the holder is projected through said opening, said means including an arm rigid with the closure and pivoted within and to the housing for swinging the closure from a position closing said opening to a position within said housing and below said opening.*

*26. A medical equipment stand in accordance with claim 25 in which said means includes means for rotating the holder from a position at least approaching the vertical to a position at least approaching the horizontal while it is being projected.*

*27. A medical equipment stand comprising, in combination, a housing having an opening and having walls above and below the opening, a closure completely closing said opening and forming when closing substantially a continuation of said walls, a holder for a plurality of medical instruments, means for moving said holder and closure in synchronism so that when the closure has at least partly cleared said opening the holder is projected through said opening, said means including elements for moving said closure parallel to said walls to a position within the housing and a panel movable with said holder from a position within the housing to a position closing said opening above said holder and forming substantially a continuation of said walls.*

*28. A medical equipment stand in accordance with claim 27 in which latch means are provided between said closure and said holder for retaining said closure in a position to close such opening as may exist below said holder.*

*29. A medical equipment stand in accordance with claim 27 in which said means includes means for rotating said holder from a position at least approaching the vertical to a position at least approaching the horizontal while it is being projected.*

*30. A medical equipment stand comprising, in combination, a housing having an opening, a movable closure for said opening, a movable holder for a plurality of medical instruments, means supported by the housing for moving said closure from an opening closing position to a position within the housing, means supported by the housing for moving said holder from a position within the housing to a projected position with respect to said opening, and means for synchronizing the movements of said closure moving means and said holder moving means, said closure moving means moving the closure rapidly with respect to the opening to allow projection of the holder and said holder moving means and said synchronizing means moving said holder at an accelerating rate as soon as the opening is clear to the end that the instruments are projected to a position for use in a minimum of time.*

*31. A medical equipment stand comprising, in combination, a housing having an opening, a movable closure for said opening, means supported by the housing for moving said closure to open and close said opening, a holder, means for supporting said holder in said housing independently of the closure, said holder having sockets for the reception of a plurality of medical instruments, the longitudinal direction of said sockets defining axes and forming a large angle with the horizontal when the holder is in said housing, means including said supporting means for moving said holder and projecting it through said opening after the closure has at least partly cleared said opening, said holder supporting and moving means during the projecting movement of the holder rotating the holder from its position within the housing to a position such that the axes of the sockets are almost horizontal when the holder is projected through said opening.*

*32. A medical equipment stand comprising, in combination, a housing having an opening and having walls above and below the opening, a closure completely closing said opening and forming when closed substantially*

*a continuation of said walls, a holder for a plurality of medical instruments, means for supporting said holder within the housing independently of said closure, a panel, elements interconnecting said closure, holder and panel to enable their operation in synchronism and means for shifting the closure to uncover said opening, projecting the instruments through said opening and shifting said panel to close at least most of the opening which remains after the closure has been shifted and the holder projected.*

*33. A medical equipment stand for use immediately adjacent a support for a patient comprising, in combination, a housing having an opening, a closure for said opening supported by the housing, a holder for a plurality of medical instruments supported within and by the housing in an essentially vertical position, elements interconnecting said closure and holder to enable their operation in synchronism, means for shifting said closure to uncover said opening and project the holder to a position substantially wholly outside the housing, means for shifting the holder during its projection to an essentially horizontal position, a motor for actuating said closure and holder shifting and projecting means, a control for initiating the operation of said motor, said control being located remote from the holder within convenient reach of the user of the instruments seated on the side of the patient opposite the stand and the position of the holder coupled with the essentially horizontal position thereof when projected bringing the instruments well over the patient enabling the user to select and grasp an instrument for use without leaving his seat and without undue reaching across the patient and withdraw the selected instrument from said holder by an essentially horizontal withdrawing motion.*

*34. A medical equipment stand comprising, in combination, a housing having an opening, a closure, means for movably supporting said closure on said housing in closing relation to said opening, a holder supported by the housing, a plurality of medical instruments mounted in said holder, said holder when the holder is within the housing retaining the instruments in a position at least approaching the vertical, means for moving the closure from the position closing said opening in a downward direction to a position within the housing uncovering said opening to enable projection of the holder and instruments through said opening, means for projecting said holder from its position within the housing through said opening to a position at least partly externally thereof and during said movement rotating said holder to a position such that the instruments are in a position at least approaching the horizontal and means interconnecting and synchronizing the closure moving means and the holder projecting means.*

*35. A medical equipment stand in accordance with claim 34 in which the holder projecting and rotating means moves the holder to a substantially horizontal position substantially wholly outside the housing to the end that a user with a patient in seated position between the user and the equipment stand may readily withdraw an instrument for use from a seated position.*

*36. A medical equipment stand comprising, in combination, a housing having an opening, a closure for said opening, means at least partly within the housing for moving said closure from a position closing said opening to a position within the housing and below said opening, a holder for a plurality of medical instruments supported within said housing independently of said closure, means for moving said holder from a position within the housing through said opening to a projected position with respect to said housing and means for synchronizing the movements of said closure and holder, said holder moving means including means for rotating the holder from a position at least approaching the vertical to a position at least approaching the horizontal while they are being projected.*

References Cited in the file of this patent or the original patent

UNITED STATES PATENTS

| | | |
|---|---|---|
| 590,261 | Haase | Sept. 21, 1897 |
| 908,710 | Thompson | Jan. 5, 1909 |
| 1,421,564 | Reche | July 4, 1922 |
| 1,525,013 | Vaaler | Feb. 13, 1925 |
| 2,125,989 | Burch | Aug. 9, 1938 |
| 2,214,774 | Pieper | Sept. 17, 1940 |
| 2,287,058 | Pieper | June 23, 1942 |
| 2,400,638 | Gayring | May 21, 1946 |
| 2,420,901 | Monnot | May 20, 1947 |
| 2,500,095 | Ries et al. | Mar. 7, 1950 |